United States Patent
Singh et al.

(10) Patent No.: US 9,692,223 B2
(45) Date of Patent: Jun. 27, 2017

(54) POWER DISTRIBUTION SYSTEMS AND METHODS OF TESTING A POWER DISTRIBUTION SYSTEM

(71) Applicant: General Electric Company, Schenectady, NY (US)

(72) Inventors: Arun Kumar Singh, Ameenpur (IN); Gary Vincent Hanrahan, Louisville, KY (US); Scott Jeffrey Hall, Louisville, KY (US)

(73) Assignee: General Electric Company, Schenectady, NY (US)

( * ) Notice: Subject to any disclaimer, the term of this patent is extended or adjusted under 35 U.S.C. 154(b) by 738 days.

(21) Appl. No.: 14/068,419

(22) Filed: Oct. 31, 2013

(65) Prior Publication Data

US 2015/0116877 A1   Apr. 30, 2015

(51) Int. Cl.
| | |
|---|---|
| H02H 3/05 | (2006.01) |
| H02H 3/02 | (2006.01) |
| H02H 7/26 | (2006.01) |
| H02H 7/30 | (2006.01) |
| H02H 3/04 | (2006.01) |

(52) U.S. Cl.
CPC ............ H02H 3/05 (2013.01); H02H 3/021 (2013.01); H02H 7/262 (2013.01); H02H 7/30 (2013.01); *H02H 3/044* (2013.01)

(58) Field of Classification Search
CPC .......... H02H 3/05; H02H 3/021; H02H 7/262; H02H 7/30; H02H 3/044
See application file for complete search history.

(56) References Cited

U.S. PATENT DOCUMENTS

| | | | |
|---|---|---|---|
| 4,468,714 A | 8/1984 | Russell | |
| 5,151,842 A * | 9/1992 | DeBiasi | H02H 7/30 |
| | | | 361/634 |
| 6,297,939 B1 | 10/2001 | Bilac et al. | |
| 6,313,975 B1 | 11/2001 | Dunne et al. | |
| 7,254,001 B2 | 8/2007 | Papallo et al. | |
| 7,570,471 B2 | 8/2009 | Weiher et al. | |
| 8,280,653 B2 | 10/2012 | Lagree | |

(Continued)

OTHER PUBLICATIONS

Schneider Electric, "Reducing Fault Stress with Zone-Selective Interlocking," Data Bulletin, Apr. 2012, 30 pages.

(Continued)

*Primary Examiner* — Zeev V Kitov
(74) *Attorney, Agent, or Firm* — General Electric Company

(57) ABSTRACT

Power distribution systems and methods are described. In one example, a method of testing a power distribution zone select interlocking system including a first circuit protection device and a second circuit protection device coupled to the first circuit protection device downstream of the first circuit protection device is described. The method includes receiving, by the second circuit protection device, an input instructing the second circuit protection device to test communication between the first circuit protection device and the second circuit protection device, and outputting, by the second circuit protection device, a blocking signal in response to the input. The first circuit protection display an indication of reception of the blocking signal to confirm proper interconnection of the zone select interlocking signals.

20 Claims, 2 Drawing Sheets

(56) References Cited

U.S. PATENT DOCUMENTS

| | | |
|---|---|---|
| 8,390,973 B2 | 3/2013 | Vicente et al. |
| 2003/0090271 A1* | 5/2003 | Hurwicz ............ G01R 31/3272 |
| | | 324/424 |
| 2010/0204933 A1* | 8/2010 | Lagree .................... H02H 7/30 |
| | | 702/58 |
| 2012/0181152 A1 | 7/2012 | Carlino et al. |

OTHER PUBLICATIONS

Schneider Electric, "Full-function Test Kit," Instruction Bulletin, v. 1.0 Sep. 2001, 40 pages.

\* cited by examiner

POWER DISTRIBUTION SYSTEMS AND METHODS OF TESTING A POWER DISTRIBUTION SYSTEM

BACKGROUND

The present application relates generally to power systems and, more particularly, to power distribution systems and methods of operating and/or testing a power distribution system.

Known electrical distribution systems include a plurality of switchgear lineups including circuit breakers that are each coupled to one or more loads. The circuit breakers typically include a trip unit that controls the circuit breakers based upon sensed current flowing through the circuit breakers. More specifically, the trip unit causes current flowing through the circuit breaker to be interrupted if the current is outside of acceptable conditions.

For example, at least some known circuit breakers are programmed with one or more current thresholds (also known as "pickup" thresholds) that identify undesired current levels for the circuit breaker. If a fault draws current in excess of one or more current thresholds for a predetermined amount of time, for example, the trip unit typically activates the associated circuit breaker to stop current from flowing through the circuit breaker. However, in power distribution systems that include a plurality of circuit breakers, a typical arrangement uses a hierarchy of circuit breakers. Large circuit breakers (i.e., circuit breakers with a high current rating) are positioned closer to a power source than lower current feeder circuit breakers and feed the lower current feeder circuit breakers. Each feeder circuit breaker may feed a plurality of other circuit breakers, which connect to loads or other distribution equipment.

A fault may occur anywhere in the circuit breaker hierarchy. When a fault occurs, each circuit breaker that has the same fault current flowing through it may detect different amounts of fault current as a result of varying sensor sensitivities and/or tolerances. When the fault occurs, the circuit breaker closest to the fault should operate to stop current from flowing through the circuit breaker. If a circuit breaker higher in the hierarchy trips, multiple circuits or loads may unnecessarily lose service.

To accommodate for the varying tolerances and to ensure that multiple circuit breakers do not unnecessarily trip based on the same fault current, the current thresholds of at least some known circuit breakers are nested with each other to avoid overlapping fault current thresholds. In some other known systems, circuit breakers in a lower tier send coordination or blocking signals to higher tier circuit breakers upon detection of a fault current. The upper tier circuit breakers' operation is coordinated with the operation of the lower tier circuit breaker in response to the blocking signal. If the circuit breakers in such a system are not installed/connected properly, the blocking/coordination signals may not be received by the higher tier devices.

BRIEF DESCRIPTION

In one aspect, a circuit protection device includes a trip mechanism configured to interrupt a current flowing through the circuit protection device, and a trip unit operatively coupled to the trip mechanism. The trip unit includes at least one blocking signal output port configured for communicative connection to a blocking signal input port of a second circuit protection device. The trip unit is configured to receive an input that instructs said trip unit to test communication with the second circuit protection device, and output a blocking signal via said blocking signal output port in response to the input.

In another aspect, a power distribution system includes a first circuit protection device including a blocking signal input port, and a second circuit protection device coupled to the first circuit protection device downstream of the first circuit protection device. The second circuit protection device includes a trip mechanism configured to interrupt a current flowing through the second circuit protection device, and a trip unit operatively coupled to the trip mechanism. The trip unit include at least one blocking signal output port configures for communication with the blocking signal input port of the first circuit protection device. The trip unit is configured to receive an input that instructs said trip unit to test communication with the first circuit protection device and output a blocking signal via the blocking signal output port in response to the input.

In yet another aspect, a method of testing a power distribution system including a first circuit protection device and a second circuit protection device coupled to the first circuit protection device downstream of the first circuit protection device is described. The method includes receiving, by the second circuit protection device, an input instructing the second circuit protection device to test communication between the first circuit protection device and the second circuit protection device, and outputting, by the second circuit protection device, a blocking signal in response to the received input.

DETAILED DESCRIPTION

Exemplary embodiments of power distribution systems and methods of operating and/or testing a power distribution system are described herein. The exemplary power distribution systems include a plurality of circuit protection devices arranged in a plurality of tiers in a zone selective interlocking (ZSI) configuration. One or more downstream (e.g., in a lower tier) circuit protection devices are operable to output a blocking signal to one or more upstream (e.g., in a higher tier) circuit protection devices to test the blocking signal connection(s). If the associated upstream circuit protection device(s) receive the blocking signal(s), the ZSI configuration and functionality are verified. If a blocking signal is not received as expected, there may be an error in the installation of the circuit protection devices. The example embodiments thus simplify installation and/or maintenance of power distribution systems by testing the configuration and functionality of a ZSI system to detect problems before actual fault conditions are experienced.

Figure 1:
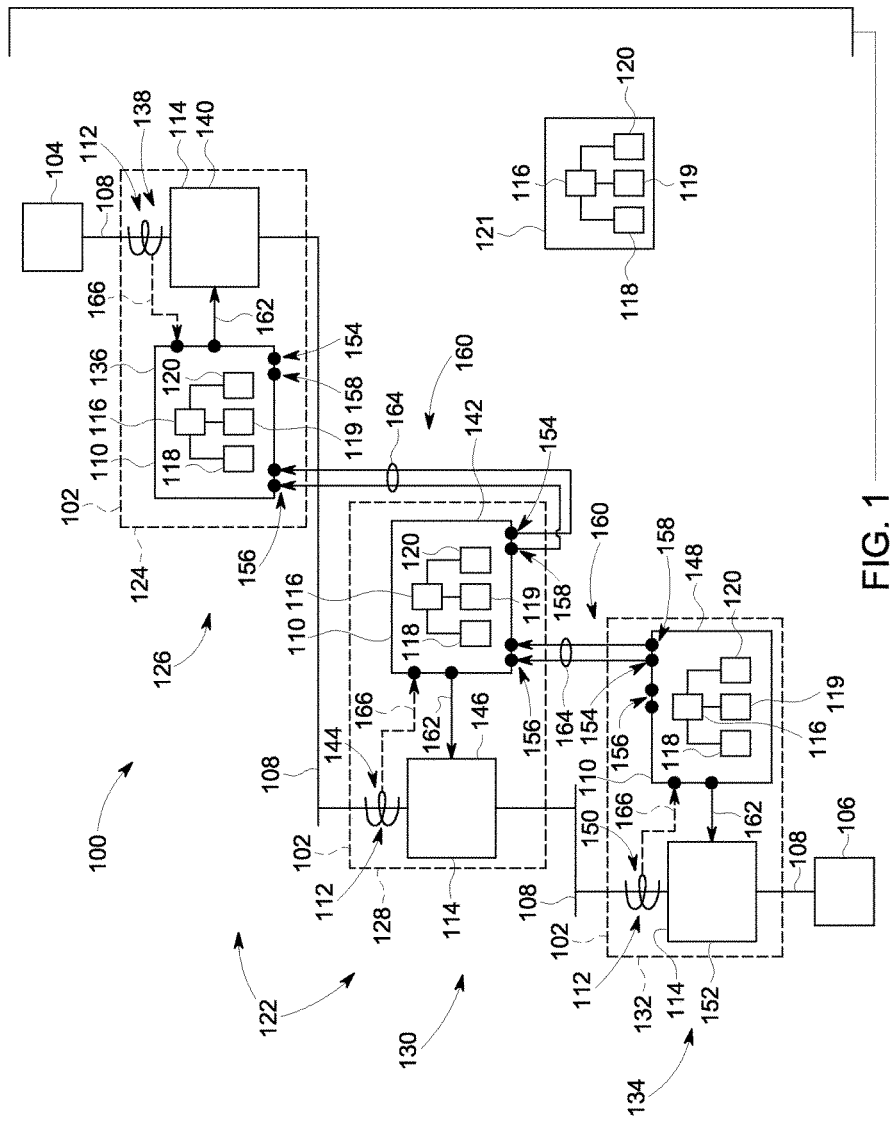
FIG. 1 is a schematic block diagram of an exemplary power distribution system.

FIG. 1 is a schematic block diagram of a portion of an exemplary power distribution system 100 illustrating a plurality of circuit protection devices 102.

Each circuit protection device 102 is configured to control a delivery of power from one or more electrical power sources 104 to one or more loads 106. Electrical power sources 104 may include, for example, one or more generators or other devices that provide electrical current (and resulting electrical power) to loads 106. The electrical current may be transmitted to loads 106 through one or more electrical distribution lines or busses 108 coupled to circuit protection devices 102. Loads 106 may include, but are not limited to only including, machinery, motors, lighting, and/or other electrical and mechanical equipment of a manufacturing or power generation or distribution facility.

In an exemplary embodiment, circuit protection device 102 is a circuit breaker. Alternatively, circuit protection device 102 may be any other device that enables power distribution system 100 to function as described herein. In an exemplary embodiment, each circuit protection device 102 includes a trip unit 110 operatively coupled to a sensor 112 and a trip mechanism 114. Trip unit 110, in an exemplary embodiment, is an electronic trip unit (ETU) that includes a processor 116 coupled to a memory 118, an input device 119, and a display device 120. Trip unit 110 may include, or be may be considered to be, a computing device. In other embodiments, trip units 110 may be any other suitable type of trip unit. In some embodiments, one or more of circuit protection devices 102 include a different type of trip unit 110 and/or is a different type of circuit protection device than at least one other of circuit protection devices 102.

Sensor 112, in an exemplary embodiment, is a current sensor, such as a current transformer, a Rogowski coil, a Hall-effect sensor, and/or a shunt that measures a current flowing through trip mechanism 114 and/or circuit protection device 102. Alternatively, sensor 112 may include any other sensor that enables power distribution system 100 to function as described herein. In an exemplary embodiment, each sensor 112 generates a signal representative of the measured or detected current (hereinafter referred to as "current signal") flowing through an associated trip mechanism 114 and/or circuit protection device 102. In addition, each sensor 112 transmits the current signal to processor 116 associated with, or coupled to, trip mechanism 114. Each processor 116 is programmed to activate trip mechanism 114 to interrupt a current provided to a load 106 or an electrical distribution line or buss 108 if the current signal, and/or the current represented by the current signal, exceeds a current threshold.

Trip mechanism 114 includes, for example, one or more circuit breaker devices and/or arc containment devices. Exemplary circuit breaker devices include, for example, circuit switches, contact arms, and/or circuit interrupters that interrupt current flowing through the circuit breaker device to a load 106 coupled to the circuit breaker device. An exemplary arc containment device includes, for example, a containment assembly, a plurality of electrodes, a plasma gun, and a trigger circuit that causes the plasma gun to emit ablative plasma into a gap between the electrodes in order to divert energy into the containment assembly from an arc or other electrical fault that is detected on the circuit.

Each processor 116 controls the operation of a circuit protection device 102 and gathers measured operating condition data, such as data representative of a current measurement (also referred to herein as "current data"), from a sensor 112 associated with a trip mechanism 114 coupled to processor 116. Processor 116 stores the current data in a memory 118 coupled to processor 116. It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Memory 118 stores program code and instructions, executable by processor 116, to control circuit protection device 102. Memory 118 may include, but is not limited to only include, non-volatile RAM (NVRAM), magnetic RAM (MRAM), ferroelectric RAM (FeRAM), read only memory (ROM), flash memory and/or Electrically Erasable Programmable Read Only Memory (EEPROM). Any other suitable magnetic, optical and/or semiconductor memory, by itself or in combination with other forms of memory, may be included in memory 118. Memory 118 may also be, or include, a detachable or removable memory, including, but not limited to, a suitable cartridge, disk, CD ROM, DVD or USB memory.

Input device 119 receives input from, for example, a user, another trip unit 110, a remote computing device, etc. Input device 119 may include, for example, a keyboard, a card reader (e.g., a smartcard reader), a pointing device, a mouse, a stylus, a touch sensitive panel (e.g., a touch pad or a touch screen), a gyroscope, an accelerometer, a position detector, a keypad, one or more buttons, and/or an audio input interface. A single component, such as a touch screen, may function as both display device 120 and input device 119. In some embodiments, input device 119 may include a communication interface to receive input from a remote computing device (including from another trip unit 110). Although a single input device 119 is shown for each trip unit 110, a trip unit 110 may include more than one input device 119.

Display device 120 visually presents information about circuit protection device 102 and/or trip mechanism 114. Display devices 120 may include a vacuum fluorescent display (VFD), one or more light-emitting diodes (LEDs), liquid crystal displays (LCDs), cathode ray tubes (CRT), plasma displays, and/or any suitable visual output device capable of visually conveying information to a user. For example, processor 116 may activate one or more components of display device 120 to indicate that circuit protection device 102 and/or trip mechanism 114 is active and/or operating normally, is receiving a blocking signal, is transmitting a blocking signal, that a fault or failure has occurred, and/or any other status of trip mechanism 114 and/or circuit protection device 102. In some embodiments, display device 120 presents a graphical user interface (GUI) to a user for interaction between the user and circuit protection device 102. The GUI permits the user, for example, to control circuit protection device 102, monitor operation/status of circuit protection device 102, test operation of circuit protection device 102, and/or modify operational parameters of circuit protection device 102.

In an exemplary embodiment, power distribution system 100 includes a remote computing device 121. Remote computing device 121 is remote in that it is not incorporated within one of the circuit protection devices 102, but may be located near other components of power distribution system 100. Remote computing device 121 includes processor 116 coupled to memory 118, input device 119, and display device 120. Remote computing device 121 is communicatively coupled to one or more of circuit protection devices 102. Remote computing device 121 may be directly connected to one or more circuit protection devices 102 and/or may be coupled to one or more circuit protection devices 102 via a network, including the Internet. The communicative coupling between remote computing device 121 and circuit protection device(s) 102 may be a wired connection or a wireless connection using any suitable wired and/or wireless communication protocols. In other embodiments, power distribution system 100 does not include remote computing device.

In an exemplary embodiment, circuit protection devices 102 are arranged in a hierarchy including a plurality of tiers 122, or circuit branches, to provide different levels of protection and monitoring to power distribution system 100. For example, in one embodiment, a first circuit protection device 124 is arranged in a first, or upstream, tier 126 to receive current from electrical power source 104. A second circuit protection device 128 is arranged in a second, or intermediate, tier 130 that is downstream of first circuit protection device 124. A third circuit protection device 132 is arranged in a third, or downstream, tier 134 that is downstream of second circuit protection device 128. Third circuit protection device 132 provides current received from electrical power source 104 (through first circuit protection device 124 and second circuit protection device 128) to load 106.

As used herein, the term "downstream" refers to a direction of current flow, for example, from electrical power source 104 towards load 106. The term "upstream" refers to a direction of current flow, for example, from load 106 towards electrical power source 104.

Moreover, first circuit protection device 124 includes a first trip unit 136, a first sensor 138, and a first trip mechanism 140, second circuit protection device 128 includes a second trip unit 142, a second sensor 144, and a second trip mechanism 146, and third circuit protection device 132 includes a third trip unit 148, a third sensor 150, and a third trip mechanism 152.

While FIG. 1 illustrates three circuit protection devices 102 arranged in three tiers 122, it should be recognized that any suitable number of circuit protection devices 102 may be arranged in any suitable number of tiers 122 to enable power distribution system 100 to function as described herein. For example, it should be recognized that one or more additional tiers 122 and/or circuit protection devices 102 may be disposed between electrical power source 104 and first circuit protection device 124 and/or first tier 126 in some embodiments. Additionally or alternatively, one or more additional tiers 122 and/or circuit protection devices 102 may be disposed between load 106 and third circuit protection device 132 in some embodiments.

As illustrated in FIG. 1, each trip unit 110 includes a plurality of ports 154 that receive signals from, and transmit signals to, other trip units 110. In an exemplary embodiment, ports 154 include at least one blocking signal input port 156 and at least one blocking signal output port 158. Blocking signal input port 156 and blocking signal output port 158 transmit one or more blocking signals 160 between circuit protection devices 102. Each trip unit's ports 154 may be physically separate ports 154 or may be a single physical port providing one or more virtual ports (e.g., ports 156 and 158).

In an exemplary embodiment, blocking signal 160 is generated by each trip unit 110 when an amount of current detected by sensor 112 exceeds a blocking threshold (not shown) defined for an associated trip mechanism 114. In addition, blocking signal 160 is transmitted, or forwarded, to an upstream trip unit 110 if blocking signal 160 is received from a downstream trip unit 110. For example, blocking signal 160 of second trip unit 142 is transmitted to upstream trip unit 110 (e.g., first trip unit 136) if second trip unit 142 received blocking signal 160 from third trip unit 148 and/or if second trip unit 142 detected a current above the blocking threshold. In response to receiving blocking signal 160, first trip unit 136 may shift from an unrestrained mode of operation to a restrained mode of operation, to prevent first trip unit 136 and second trip unit 142 from operating at similar trip timing sequences. Additionally or alternatively, first trip unit 136 may switch to operating at, or using, a higher trip threshold, such as switching from a protective threshold to a backup threshold, in response to receiving blocking signal 160.

In the unrestrained mode of operation, an unrestrained trip timing sequence may be executed that includes accumulating time values in which the current exceeds the protective threshold until an unrestrained time threshold is reached. In the restrained mode of operation, a restrained trip timing sequence may be executed that includes accumulating time values in which the current exceeds the backup threshold until a restrained time threshold is reached. If the restrained time threshold or the unrestrained time threshold is reached, trip unit 110 generates trip signal 162. Alternatively, the unrestrained trip timing sequence and the restrained trip timing sequence may include any other actions or responses that enable trip units 110 to function as described herein. It should be recognized that the unrestrained trip timing sequence causes trip signal 162 to be generated in a period of time that is shorter than a period of time in which the restrained trip timing sequence causes trip signal 162 to be generated.

Ports 154 of a trip unit 110 are coupled to ports 154 of other trip units 110 by one or more conductors 164. In an exemplary embodiment, each port 154 includes a positive terminal and a negative terminal for coupling to conductors 164 carrying positive and negative signals, respectively. For example, conductors 164 transmit positive and negative components of blocking signals 160 to the positive and negative terminals of ports 154. Alternatively, ports 154 may receive any suitable signal and/or may include any suitable number of terminals that enables trip units 110 to function as described herein. It should be recognized that signals of the same polarity may be used instead of signals of positive and negative polarity. For example, a "positive" signal may be a signal that has an amplitude that is higher than an amplitude of a "negative" signal.

In an exemplary embodiment, blocking signal output port 158 of trip unit 110 (e.g., second trip unit 142) is coupled to blocking signal input port 156 of upstream trip unit 110 (e.g., first trip unit 136). In a specific embodiment, a single circuit protection device 102 is positioned at the next tier upstream of the referenced circuit protection device 102 (and the associated trip unit 110) such that blocking signal output port 158 of the referenced trip unit 110 is coupled to blocking signal input port 156 of the upstream trip unit 110 by at least one conductor 164. In addition, blocking signal input port 156 of the referenced trip unit 110 (e.g., second trip unit 142) is coupled to blocking signal output port 158 of one or more downstream trip units 110 (e.g., third trip unit 148) by at least one conductor 164.

Each circuit protection device 102 (and each associated trip unit 110) is configured as described above such that trip units 110 receive one or more blocking signals 160 from downstream trip units 110 through blocking signal input port 156 and transmit one or more blocking signals 160 to upstream trip units 110 through blocking signal output port 158. In an exemplary embodiment, blocking signals 160 received from a downstream trip unit 110 are automatically forwarded on to upstream trip units 110. For example, if second trip unit 142 receives blocking signal 160 from third trip unit 148, second trip unit 142 transmits blocking signal 160 to first trip unit 136.

In addition, sensor 112 measures current flowing through trip mechanism 114 (e.g., through electrical distribution bus 108 that is coupled to trip mechanism 114). Sensor 112 generates a current signal 166 representative of the measured or detected current flowing through trip mechanism 114, and transmits current signal 166 to trip unit 110. Trip unit 110 is programmed to activate trip mechanism 114 based on current signal 166 by transmitting trip signal 162 to trip mechanism 114, thus causing trip mechanism 114 to interrupt the current flowing therethrough as described above.

During operation, if a fault occurs proximate to second circuit protection device 128, for example, second sensor 144 detects the total amount of current (including a fault current) flowing through electrical distribution bus 108. Second sensor 144 transmits current signal 166 to second trip unit 142, and second trip unit 142 compares the amount of current represented by current signal 166 to one or more predetermined current thresholds of second trip unit 142, such as the blocking threshold.

If the detected amount of current exceeds the blocking threshold, second trip unit 142 transmits blocking signal 160 to first trip unit 136. In addition, if the detected amount of current exceeds the protective threshold, second trip unit 142 initiates a trip timing sequence, such as the unrestrained trip timing sequence. In contrast, if the detected amount of current exceeds the blocking threshold but does not exceed the protective threshold, second trip unit 142 refrains from initiating a trip timing sequence. Upon the receipt of blocking signal 160, first trip unit 136 switches to operating in the restrained mode of operation and uses, or operates at, the backup threshold. Accordingly, first trip unit 136 accumulates time values in which the current exceeds the backup threshold until the restrained time threshold is reached. If the restrained time threshold is reached, first trip unit 136 generates trip signal 162. Accordingly, first trip unit 136 does not initiate a trip sequence (after receiving blocking signal 160) until the current exceeds the backup threshold.

First trip unit 136 and third trip unit 148 operate similarly as second trip unit 142. Accordingly, first trip unit 136 and third trip unit 148 compare detected amounts of current with one or more predetermined current thresholds, such as the blocking threshold, the protective threshold, and/or the backup threshold. In a similar manner as described above, first trip unit 136 and third trip unit 148 initiate trip timing sequences if the protective threshold or the backup threshold is exceeded, and generate blocking signal 160 if the blocking threshold is exceeded. First trip unit 136 and third trip unit 148 transmit blocking signals 160 to upstream trip units 110 (if present) if the blocking threshold is exceeded.

Figure 2:
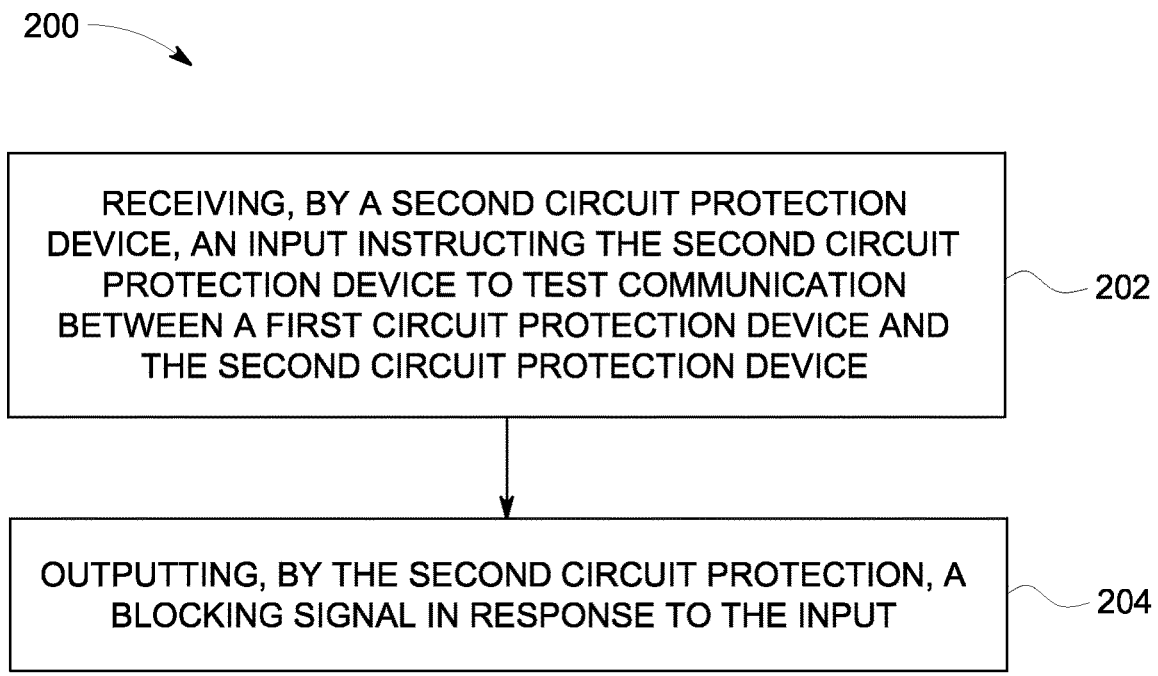
FIG. 2 is a flow diagram of an exemplary method of operating a power distribution system, such as the power distribution system shown in FIG. 1.

FIG. 2 is a flow diagram of an exemplary method 200 of testing a power distribution system, such as power distribution system 100 (shown in FIG. 1) including a first and a second circuit protection device. In an exemplary embodiment, method 200 is executed by processor 116 of one or more of trip units 110. In an exemplary embodiment, a plurality of computer-executable instructions is embodied within a computer-readable medium, such as memory 118 (shown in FIG. 1). The instructions, when executed by the processor, cause the processor to execute the steps of method 200 and/or to function as described herein.

Method 200 includes receiving 202, by the second circuit protection device, an input instructing the second circuit protection device to test communication between the first circuit protection device and the second circuit protection device. The first and second circuit protection devices may be any two circuit protection device in system 100 that share the appropriate upstream/downstream relationship. For explanatory purposes, method 200 will described with reference to first circuit protection device 124 and second circuit protection device 128.

Second circuit protection device 128 receives the instruction to test the communication via input device 116. As described above, input device 116 may be a user input device, such as a keypad, or an input device 116 for receiving input from a remote computing device. In some embodiments, the input instructing second circuit protection device 128 to test communication is received from a user selection via a user input device. In some embodiments, the user input device is a keypad. In other embodiments, the user input device is a dedicated test button (e.g., a push button that always initiates a test of the blocking signal connection). In still other embodiments, the input is received via a user interface displayed on display device 120. The user may make a selection directly on display device 120 if display device 120 is, for example, a touchscreen display device. Alternatively, the user may utilize input device 116 to make selections in the user interface, including selecting to test the communication between first and second circuit protection devices 124 and 128. Additionally, or alternatively, the input instructing the testing of communication may be received from another computing device via input device 116. The other computing device may be, for example, remote computing device 121, a trip unit 110 in another circuit protection device 120, or any other suitable computing device.

At 204, second circuit protection device 128 outputs a blocking signal in response to the input. In an exemplary embodiment, the blocking signal is output via blocking signal output port 158. In the exemplary embodiment, the blocking signal output during a test is the same blocking signal that is output when a fault current is detected. Alternatively, the blocking signal may be a test signal that is different than the blocking signal output in the event of an actual fault current detection. If system 100 is installed correctly and first and second circuit protection devices 124 and 128 are properly connected, the blocking signal 164 is carried by conductors 164 to first circuit protection device 124. If something is wrong with system 100, for example if first and second circuit protection devices 124 and 128 are not properly connected, first circuit protection device 124 may not receive the blocking signal output by second circuit protection device.

In an exemplary embodiment, second circuit protection device 128 outputs the blocking signal for a predetermined length of time. The predetermined length of time is selected to permit determination of whether or not first circuit protection device 124 receives the blocking signal. In some embodiments, the predetermined length of time is about thirty seconds. Alternatively, the predetermined length of time is shorter or longer than thirty seconds. In still other embodiments, second circuit protection device 128 outputs the blocking signal until receiving a selection to terminate testing the blocking signal connection. For example, the blocking signal may be output until a user releases a test button, until the user presses the test button a second time, until the user makes a selection in the user interface to terminate the test, until the user makes a selection on first circuit protection device 124 to terminate the test, etc.

First circuit protection device 124 determines whether or not it has received the blocking signal from second circuit protection device. In the exemplary embodiment, the first circuit protection device 124 reacts to the blocking signal in the same manner that it reacts to a blocking signal received in response to an actual fault current. For example, the first circuit protection device 124 may shift from unrestrained operation to restrained operation. If the blocking signal is a test signal different than the ordinary blocking signal, first circuit protection device 124 determines that it is receiving the test signal version of the blocking signal and may not change its mode of operation.

First circuit protection device 124, additionally or alternatively, provides an indication that it is receiving the blocking signal from second circuit protection device 128. The indication may be a human recognizable indication and/or a computer recognizable indication. Human recognizable indications may be audio and/or visual indications, including, for example, lighting or extinguishing an LED or other light, displaying a message on display device 120, and/or sounding an audible alarm. Computer recognizable indications may include sending a signal to another trip unit 110 and/or to remote computing device 121 informing the other device that the blocking signal has been received by first circuit protection device 124. In some embodiments, first circuit protection device 124 transmits a signal to second circuit protection device 128 indicating that it has received the blocking signal and second circuit protection device 128 provides an indication that first circuit protection device 124 received the blocking signal.

A technical effect of the methods and systems described herein may include one or more of: (a) receiving an input instructing a second circuit protection device to test communication between a first circuit protection device and the second circuit protection device; (b) outputting, by the second circuit protection device, a blocking signal in response to the input; (c) determining, by the first circuit protection device, if the blocking signal is received by the first circuit protection device; and (d) displaying on a display device of the first circuit protection device an indication that the blocking signal is received.

Exemplary embodiments of power distribution systems and methods of operating a power distribution system are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the power system as described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A circuit protection device comprising:
a trip mechanism configured to interrupt a current flowing through said circuit protection device; and
a trip unit operatively coupled to said trip mechanism, said trip unit comprising at least one blocking signal output port configured for communicative connection to a blocking signal input port of a second circuit protection device, said trip unit configured to:
receive a non-fault input that instructs said trip unit to test communication with the second circuit protection device without tripping said trip unit; and
output, for a length of time, a blocking signal via said blocking signal output port in response to the non-fault input.

2. A circuit protection device in accordance with claim 1, wherein said trip unit is configured to output the blocking signal in response to the non-fault input that instructs said trip unit to test communication with the second circuit breaker.

3. A circuit protection device in accordance with claim 1, wherein said trip unit further comprises an input device configured to receive the non-fault input that instructs said trip unit to test communication with the second circuit protection device.

4. A circuit protection device in accordance with claim 3, wherein said input device comprises at least one least one button.

5. A circuit protection device in accordance with claim 4, wherein said at least one button comprises a keypad including a plurality of buttons.

6. A circuit protection device in accordance with claim 3, wherein said trip unit further comprises a display device configured to display a user interface, and wherein said trip unit is configured to receive the non-fault input via a selection in the user interface.

7. A circuit protection device in accordance with claim 1, wherein said trip unit is configured to receive the non-fault input from a remote computing device.

8. A circuit protection device in accordance with claim 1, wherein the length of time comprises a predetermined length of time sufficient to permit a user to determine that the blocking signal has been received by the second circuit protection device.

9. A power distribution system comprising:
a first circuit protection device comprising a blocking signal input port; and
a second circuit protection device coupled to said first circuit protection device downstream of said first circuit protection device, said second circuit protection device comprising:
a trip mechanism configured to interrupt a current flowing through said second circuit protection device; and
a trip unit operatively coupled to said trip mechanism, said trip unit comprising at least one blocking signal output port configured for communication with said blocking signal input port of said first circuit protection device, said trip unit configured to:
receive a non-fault input that instructs said trip unit to test communication with said first circuit protection device without tripping said trip unit; and
output a blocking signal via said blocking signal output port in response to the non-fault input.

10. A power distribution system in accordance with claim 9, wherein said first circuit protection device is configured to determine if the blocking signal is received at said blocking signal input port.

11. A power distribution system in accordance with claim 10, wherein said first circuit protection device further comprises a display device, and wherein said first circuit protection device is configured to display on said display device an indication that the blocking signal is received when said first circuit protection device determines that the blocking signal is received at said blocking signal input port.

12. A power distribution system in accordance with claim 9, wherein said trip unit is configured to receive the non-fault input from a remote computing device.

13. A power distribution system in accordance with claim 12, wherein said first circuit protection device comprises the remote computing device.

14. A power distribution system in accordance with claim 9, wherein said trip unit is further configured to:
determine a current flowing through said second protection device;
activate said trip mechanism based on a determination that the current flowing through said second circuit protection device exceeds a protective threshold; and
transmit the blocking signal to said first circuit protection device upon a determination that the current exceeds a blocking threshold.

15. A power distribution system in accordance with claim 14, wherein said first circuit protection device is configured to switch from an unrestrained mode of operation to a restrained mode of operation in response to receiving the blocking signal.

16. A method of testing a power distribution system including a first circuit protection device and a second circuit protection device coupled to the first circuit protection device downstream of the first circuit protection device, said method comprising:
receiving, by the second circuit protection device, a non-fault input instructing the second circuit protection device to test communication between the first circuit protection device and the second circuit protection device without tripping the second circuit protection device or the first circuit protection device; and
outputting, by the second circuit protection device, a blocking signal in response to the received non-fault input.

17. A method in accordance with claim 16, further comprising determining, by the first circuit protection device, if the blocking signal is received by the first circuit protection device.

18. A method in accordance with claim 17, wherein said first circuit protection device further comprises a display device, and wherein said method further comprises displaying on the display device an indication that the blocking signal is received when said first circuit protection device determines that the blocking signal is received.

19. A method in accordance with claim 16, wherein receiving the non-fault input comprises receiving the non-fault input from a remote computing device.

20. A method in accordance with claim 16, wherein receiving the non-fault input comprises receiving the non-fault input via an input device on the second circuit protection device.

* * * * *